US011402724B1

(12) United States Patent
Blanco-Redondo et al.

(10) Patent No.: US 11,402,724 B1
(45) Date of Patent: Aug. 2, 2022

(54) DUAL-RING RESONATORS FOR OPTICAL FREQUENCY COMB GENERATION

(71) Applicant: NOKIA SOLUTIONS AND NETWORKS OY, Espoo (FI)

(72) Inventors: Andrea Blanco-Redondo, Berkeley Heights, NJ (US); Ali Eshaghian Dorche, Decatur, GA (US); Brian Stern, Holmdel, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 25 days.

(21) Appl. No.: 17/150,354

(22) Filed: Jan. 15, 2021

(51) Int. Cl.
*G02F 1/39* (2006.01)
*G02B 6/12* (2006.01)

(52) U.S. Cl.
CPC ......... *G02F 1/395* (2013.01); *G02B 6/12007* (2013.01); *G02F 2203/15* (2013.01); *G02F 2203/54* (2013.01); *G02F 2203/56* (2013.01)

(58) Field of Classification Search
CPC .............. G02B 6/12007; G02F 1/395; G02F 2203/15; G02F 2203/54; G02F 2203/56
See application file for complete search history.

(56) References Cited

U.S. PATENT DOCUMENTS

| 7,982,944 | B2 | 7/2011 | Kippenberg et al. |
| 9,490,605 | B2 | 11/2016 | Gaeta et al. |
| 10,224,688 | B2 | 3/2019 | Koptyaev et al. |
| 10,451,806 | B1* | 10/2019 | Puckett ..................... G02F 2/02 |
| 2008/0129419 | A1* | 6/2008 | Cheng .................... H01P 7/082 333/204 |
| 2020/0142277 | A1 | 5/2020 | Ebrahim-Zadeg et al. |
| 2021/0373362 | A1* | 12/2021 | Okawachi ............... G02F 1/212 |

FOREIGN PATENT DOCUMENTS

| CN | 112859247 A * | 5/2021 | ......... G02B 6/29338 |
| EP | 3316011 A1 * | 5/2018 | ............. G02B 6/122 |
| EP | 3385784 A1 * | 10/2018 | ........... G02F 1/3536 |
| WO | WO-2015057210 A1 * | 4/2015 | ............... G02B 6/00 |

OTHER PUBLICATIONS

Long-haul coherent communications using microresonator-based frequency combs, by Attila Fülöp et al, vol. 25, No. 22 | Oct. 30, 2017 | Optics Express 26678.
Four-wave Mixing in Integrated Silicon Nitride Waveguides, Jacob S. Levy et al, 2009 OSA/CLEO/IQEC 2009, paper CMFF5.

(Continued)

*Primary Examiner* — Daniel Petkovsek
(74) *Attorney, Agent, or Firm* — Stratford Group Ltd.

(57) ABSTRACT

A planar optical resonator capable of parametrically generating frequency combs includes two optical waveguide cores forming inner and outer loops, the resonator having two sections, in which laterally adjacent segments of the cores are resonantly optically coupled to each other at two separate wavelength regions causing separate peaks in the second order dispersion. The resonator sections may be configured to suppress integrated dispersion of the resonator in a broad spectral range favorably for generating a spectrally uniform frequency comb.

25 Claims, 10 Drawing Sheets

(56) References Cited

OTHER PUBLICATIONS

Kim, S., Han, K., Wang, C. et al. Dispersion engineering and frequency comb generation in thin silicon nitride concentric microresonators. Nat Common 8, 372 (2017). https://doi.org/10.1038/s41467-017-00491-x.

Enabling Arbitrary Wavelength Optical Frequency Combs on Chip, M. Soltani et al, arXiv:1509.07902v1 [physics. optics] Sep. 25, 2015.

Stern, B., Ji, X., Okawachi, Y. et al. Battery-operated integrated frequency comb generator. Nature 562, 401-405 (2018). https://doi.org/10.1038/s41586-018-0598-9.

Bok Young Kim, Yoshitomo Okawachi, Jae K. Jang, Mengjie Yu, Xingchen Ji, Yun Zhao, Chaitanya Joshi, Michal Lipson, and Alexander L. Gaeta, "Turn-key, high-efficiency Kerr comb source," Opt. Lett. 44, 4475-4478 (2019).

Levy, J., Gondarenko, A., Foster, M. et al. CMOS-compatible multiple-wavelength oscillator for on-chip optical interconnects. Nature Photon 4, 37-40 (2010). https://doi.org/10.1038/nphoton.2009.259.

Ali Eshaghian Dorche, Doğan Timuçin, Krishnan Thyagarajan, Thomas Wunderer, Noble Johnson, and David Schwartz, "Advanced dispersion engineering of a III-nitride micro-resonator for a blue frequency comb," Opt. Express 28, 30542-30554 (2020).

Ultrashort Pulses in Optical Microresonators With Kerr Nonlinearity, Hossein Taheri, PhD Dissertation, School of Electrical and Computer Engineering Georgia Institute of Technology, May 2017.

Fengnian Xia, Mike Rooks, Lidija Sekaric, and Yurii Vlasov, "Ultra-compact high order ring resonator filters using submicron silicon photonic wires for on-chip optical interconnects," Opt. Express 15, 11934-11941 (2007).

Taheri, Hossein, et al., "Quartic Dissipative Solitons in Optical Kerr Cavities", Optics Letters, vol. 44, No. 12, 2019, p. 3086.

* cited by examiner

DUAL-RING RESONATORS FOR OPTICAL FREQUENCY COMB GENERATION

TECHNICAL FIELD

The present disclosure relates to photonic integrated circuits and in particular to components thereof for generating optical frequency combs.

BACKGROUND

Optical frequency comb generators that provide a plurality of uniformly spaced optical frequencies may be useful in a variety of applications, including but not limited to optical communication systems and optical sensors.

Integrated micro-resonators in particular can be used as such generators, and may be capable of producing stable optical frequency combs, potentially replacing an array of individual lasers, e.g. as sources of optical carriers for dense wavelengths division multiplexing (DWDM) systems. Spectral tones of the frequency combs may also be frequency locked, thereby reducing free-running noise (jitter) for each optical tone (comb line). The integration of sources of multiples optical carriers into a single frequency comb platform may be advantageous for improving the compactness, stability, and spectral density of WDM or DWDM integrated systems and reducing their power requirements. However, providing integrated generators of optical frequency combs that have a broad and uniform optical power spectrum has remained a challenge.

SUMMARY

Embodiments described herein relate to photonic integrated circuits utilizing dual-ring resonators in which at least one of optical waveguides forming the dual rings varies in width to provide a flattened dispersion spectrum.

An aspect of the present disclosure provides an apparatus comprising an optical resonator comprising two optical waveguide cores extending over a planar surface of a substrate. The two optical waveguide cores comprise a first optical waveguide core forming a first loop, and a second optical waveguide core forming a second loop. A bus optical waveguide is being optically coupled to the first optical waveguide core in a bus coupling region. The planar optical resonator comprises first and second resonator sections, on each of the resonator sections adjacent segments of the optical waveguide cores being evanescently optically coupled, wherein the first resonator section supports wavelength-selective co-propagation therealong of light in the two optical waveguide cores at a first wavelength, and wherein the second resonator section supports wavelength-selective co-propagation therealong of light in the two optical waveguide cores at a second wavelength different from the first wavelength. The apparatus of claim 1, wherein one of the first and second optical waveguide cores has a width or a height that is smaller in the first resonator section than in the second resonator section. In some implementations, the width changes by 40 nm or more from the first to the second resonator section. In some implementations, the one of the first and second optical waveguide cores comprises a tapered section between the first and second resonator sections. In some implementations, the one of the first and second optical waveguide cores is not tapered in either the first or the second resonator sections. In some implementations, the tapered section is in a region remote from the bus coupling region. In any of the above implementations, the optical waveguide cores may be resonantly optically coupled at two separated wavelength regions adjacent the first and second wavelengths. In any of the above implementations, the first and second wavelengths may be located at opposite side of a target operating wavelength of the planar optical resonator, and are spaced by a wavelength spacing in a range from 40 nm to 400 nm. In any of the above implementations, the first and second wavelengths may be located at opposite sides of a target operating wavelength of the planar optical resonator, and are spaced by a wavelength spacing in a range from 40 nm to 400 nm. In any of the above implementations, each of the adjacent segments of the optical cores in the first and second resonator sections may have a segment length of at least 50 microns. In any of the above implementations, the widths and the segment lengths may be such that an integrated dispersion of the planar optical resonator does not exceed 0.5 GHz across an optical spectral range having a width of 5 THz.

An aspect of the present disclosure provides an apparatus comprising a planar optical resonator comprising two optical waveguide cores located along a planar surface of a substrate. The two optical waveguide cores comprise a first optical waveguide core forming a first loop, and a second optical waveguide core forming a second loop inside the first loop. A bus optical waveguide is being optically coupled to the first optical waveguide core in a bus coupling region. A width of at least one of the optical waveguide cores varies such that the optical waveguide cores resonantly optically couple at two separated wavelength regions. In some implementations, center wavelengths of the two separate wavelength regions are separated by at least 40 nm and at most 400 nm, and are located at opposite sides of a target operating wavelength of the planar optical resonator. In some implementation, the at least one of the two optical waveguide cores comprises two segments that differ in width by at least 40 nm, wherein one of the two segments is resonantly optically coupled to a laterally adjacent segment of the two optical waveguide cores at a first one of the two separate wavelength regions, and the other one of the two segments is resonantly optically coupled to a corresponding laterally adjacent segment of the two optical waveguide cores at a second one of the two separate wavelength regions. In any of the above implementations, the two segments are connected with a taper segment, and wherein the two segments and laterally adjacent segments of the other of the two optical waveguide cores are not tapered. In any of the above implementations, the two segments are each at least 40 microns long. In any of the above implementations, the two segments are such that an integrated mode dispersion of the planar optical resonator does not exceed 0.4 GHz over an optical frequency bandwidth of 2% of a target operating optical frequency of the planar optical resonator.

An aspect of the present disclosure provides an apparatus comprising an optical resonator comprising two optical waveguide cores located along a planar surface of a substrate. The two optical waveguide cores comprise a first optical waveguide core forming a first loop, and a second optical waveguide core forming a second loop. A bus optical waveguide is being optically coupled to at least one of the first optical waveguide core in a bus coupling region. A width or height of one of the two optical waveguide cores varies such that the integrated mode dispersion of the planar optical resonator does not exceed 0.5 GHz over an optical frequency region having a width of 5 THz. A width of the one of the two optical waveguide cores may differ by at least 40 nm between a first section and a second section of the planar optical resonator, each of the first and second sections comprising adjacently extending segments of the two optical cores, the segments being such that the two optical waveguide cores are resonantly optically coupled in the first and second sections in different wavelength regions.

An aspect of the present disclosure provides an apparatus comprising an optical resonator comprising two optical waveguide cores extending over a planar surface of a substrate. The two optical waveguide cores comprise a first optical waveguide core forming a first loop, and a second optical waveguide core forming a second loop. A bus optical waveguide is being optically coupled to the first optical waveguide core in a bus coupling region. At least one of the two optical waveguide cores comprises first and second segments of different widths and a taper segment, the first and second segments being evanescently optically coupled therealong to adjacent segments of the other of the two optical waveguide cores, and wherein the taper segment is located in a region remote from the bus coupling region. In at least some implementations the first segment may differs in width from the second segment by at least 40 nm. In at least some implementations the first and second segments and the adjacent segments of the other of the two optical waveguide cores are not tapered. In at least some implementations the first and second segments are each at least 40 microns long. In any of the above implementations the first and second segments together may have a length of at least 70% of a total length of the one of the two optical waveguide cores. In any of the above implementations the first and second segments may be resonantly optically coupled to the respective adjacent segments of the other of the two optical waveguide cores at two distinct coupling wavelengths. In any of the above implementations the two distinct coupling wavelengths may be located at opposite sides of a target operating wavelength of the planar optical resonator, and are spaced apart by a wavelength spacing in a range from 40 nm to 400 nm. In any of the above implementations the wavelength spacing may be in a range from 80 nm to 250 nm. In any of the above implementations the first and second segments may be constructed such that light in the first segment and a corresponding adjacent segment of the other of the two optical waveguide cores co-propagate therealong at a first wavelength, and light in the second segment and a corresponding adjacent segments of the other of the two optical waveguide cores co-propagate therealong at a second wavelength distinct from the first wavelength. In any of the above implementations the first and second segments may be constructed such that an integrated dispersion of the planar optical resonator does not exceed 0.4 GHz across an optical spectral bandwidth of 2% of a target operating optical frequency of the planar optical resonator.

An aspect of the present disclosure provides an apparatus comprising a planar optical resonator comprising two optical waveguide cores located along a planar surface of a substrate, the two optical waveguide cores comprising a first optical waveguide core forming a first loop, and a second optical waveguide core forming a second loop inside the first loop. A bus optical waveguide is optically coupled to, at least, the first optical waveguide core in a bus coupling region. End-connected first and second segments of the planar optical resonator comprise evanescently coupled segments of the two optical waveguide cores. The two optical waveguide cores are configured to co-propagate light therealong at a first wavelength in the first segment of the optical resonator, and to co-propagate light therealong at a different second wavelength in the second segment of the optical resonator. One of the optical waveguide cores may have a smaller width in the first segment of the planar optical resonator section than in the second segment of the optical resonator. One of the optical waveguide cores may comprise a tapered section between the first and second segments of the optical resonator. The one of the first and second wavelengths may be spaced by a wavelength spacing in a range from 40 nm to 400 nm.

In accordance with any of the above aspects and in any of the above implementations, the apparatus may comprise a laser connected to inject light into the bus waveguide such that the planar optical resonator outputs light whose spectrum has a comb of wavelength peaks.

In accordance with any of the above aspects and in any of the above implementations, the two optical waveguide cores may comprise silicon nitride.

BRIEF DESCRIPTION OF THE DRAWINGS

Example embodiments are described below in conjunction with the drawings, which are not to scale, in which like elements are indicated with like reference numerals, and in which.

DETAILED DESCRIPTION

Figure 1A:
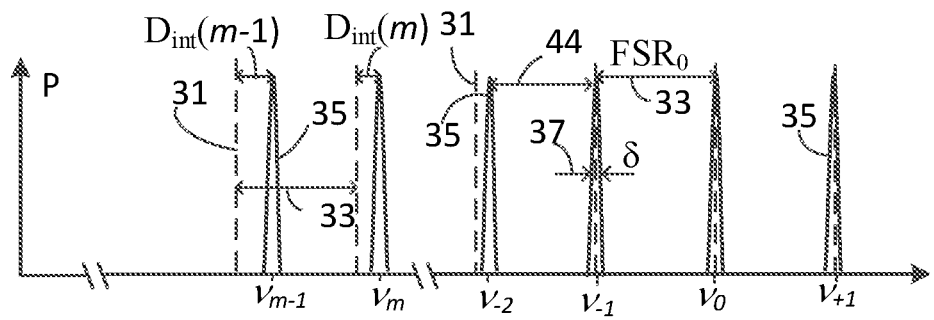
FIG. 1A is a graph illustrating resonances of an optical waveguide ring resonator, and the integrated mode dispersion Dint(m) as a measure of their shift from an equidistant frequency grid.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Reference throughout this specification to "one embodiment" or "an embodiment" means that a particular feature, structures, or characteristics may be combined in any suitable manner in one or more embodiments. As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. "Or" is used herein in non-exclusive sense, so that an expression "A or B" does not exclude "both A and B", unless explicitly stated otherwise. Terms "higher index" and "lower index" may be used herein to indicate relative values of refractive indices in an operating wavelength range of an optical device and/or an optical waveguide being described. The term "ring" encompasses closed loops of circular and non-circular shapes without self-crossings. The terms "light", "optical", and their derivatives as used herein are not limited to visible electromagnetic radiation, but also encompass parts of ultraviolet and infrared spectra capable of low-loss propagation in waveguides described herein.

Aspects of the present disclosure relate to photonic integrated circuits (PICs) utilizing ring optical waveguides. A ring optical waveguide has an optical core forming a closed loop so that light can complete multiple roundtrips within the loop. A ring optical waveguide can thus operate as a ring resonator capable of accumulating optical energy at resonance frequencies $v_m$. These resonance frequencies $v_m$ are also referred to as the mode frequencies, and their spacing referred to as the free spectral range (FSR) of the ring resonator. When the optical loss at each roundtrip is small, and the quality (Q) factor of the ring resonator is large, Q>>1, pumping the ring optical waveguide at a pump optical frequency $v_p$ that is tuned to one of the ring resonances, may result in an optical energy density in the optical core of the ring resonator that is sufficiently high to excite neighboring ring resonances through parametric degenerate four-wave mixing (FWM). The FWM is predicated on a third-order optical nonlinearity of the optical core material, also referred to as the optical Kerr nonlinearity.

The newly excited resonance frequencies may in turn parametrically generate, through non-degenerate FWM, a cascade of additional optical frequencies arranged in an equidistant frequency comb. The optical frequencies in the comb may become mode-locked, resulting in the formation a train of narrow optical pulses. The generation of a cascade of optical frequencies by parametric FWM may be limited by a mode dispersion in the ring resonator, which manifests itself in the mode frequencies $v_m$ of the resonator being non-equally spaced, resulting in the FSR of the ring resonator that varies with the optical frequency, $FSR=FSR(m) =(v_m-v_{m-1})$.

This mode dispersion is illustrated in FIG. 1A, which schematically shows resonator mode functions 35, centered at the resonance frequencies $v_m$, relative to an equidistant FWM frequency grid 31 represented by vertical dashed lines. The mode functions 35 have a width δ 37, which may be defined as the full-width at half-maximum (FWHM), i.e. δ, and which is inversely proportional to the Q-factor of the resonator, $Q=v_0/δ$. In the following description modes of the resonator may be assigned mode numbers m counting from the mode that is closest to the optical frequency $v_p$ of the pump light, and which mode frequency may be denoted $v_0$. The pump energy coupled into the mode at $v_0$ parametrically excites neighboring modes at resonance frequencies $v_1$ and $v_{-1}$, which spacing is twice the spacing $FSR_0$ of the FWM grid 31. Here $FSR_0=0.5 \cdot (v_1-v_{-1})$ denotes the FSR at the center (pump) frequency $v_0$, which may also be referred to as the nominal FSR of the resonator.

Referring again to FIG. 1A, the detuning of a mode frequency $v_m$ from a corresponding, i.e. $m^{th}$, line of the equidistant FWM grid 31 may be described using a mode dispersion function $D_{int}(m)$, which may also be referred to herein as the integrated dispersion. The integrated dispersion $D_{int}(m)$ may thus be defined by the following equation (1):

$$D_{int}(m)=v_m-v_0-F_{SR0} \cdot m \qquad (1)$$

As the mode dispersion $D_{int}(m)$ rises in magnitude away from the pump frequency, the parametric amplification of the optical power in the corresponding mode weakens, which leads to a power roll-off of the frequency comb away from the pump frequency and limits the width of the frequency comb.

Figure 1B:
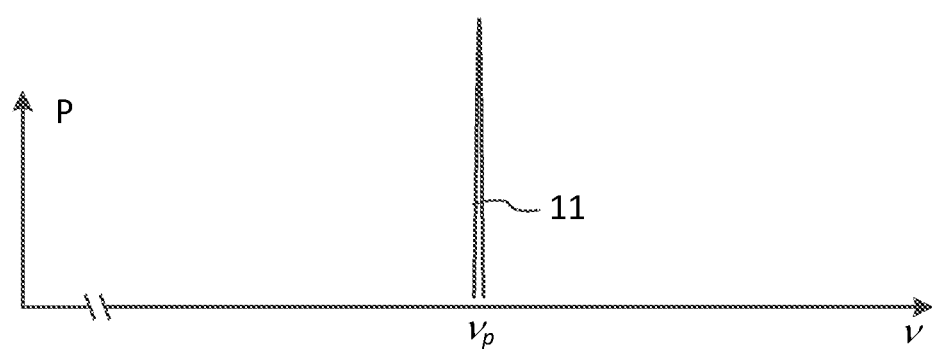
FIG. 1B is a graph illustrating an optical spectrum of pump light.
Figure 1C:
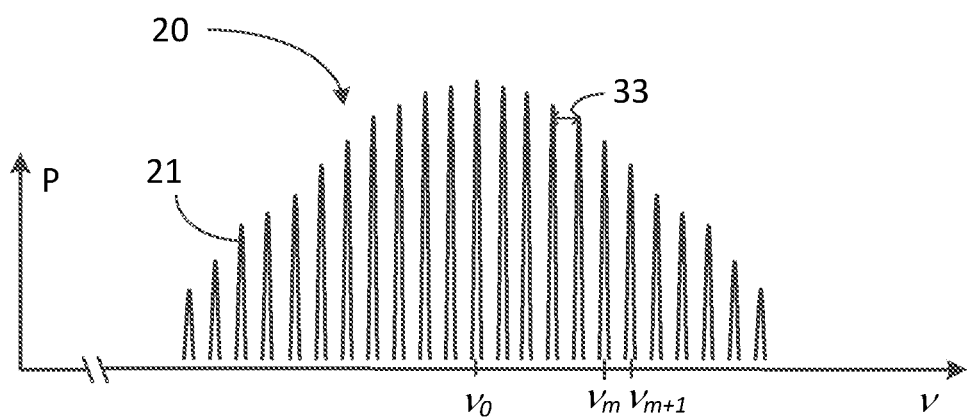
FIG. 1C is a graph illustrating a frequency comb parametrically generated in a ring resonator with dispersion when pump with the pump light of FIG. 1B.

FIGS. 1B and 1C schematically illustrate optical spectra of an input and output optical signal of a ring resonator under the conditions of dispersion-limited parametric frequency comb generation. FIG. 1B shows the optical spectrum of pump light, which may be in the form of a single spectral line 11 at the pump optical frequency $v_p$. The pump light may be generated, for example, by a suitable pump laser, e.g. a high-power single-frequency laser diode. FIG. 1B shows an optical spectrum of light within the ring resonator when the pump power is high enough to excite the cascaded parametric FWM, producing a frequency comb spectrum 20 comprising a plurality of spectral lines 21 spaced by an FSR 33. The pump wavelength is assumed to be tuned to one of the resonance frequencies of the ring resonator, denoted $v_0$. Changes in the FSR of the ring resonator away from the pump frequency puts a limit on the number of spectral lines in the comb, and affects its shape and stability. The power roll-off of the optical frequency comb 20 away from the central frequency $v_0$ is due to, at least in part, the rising integrated dispersion $D_{int}(m)$ as described above.

Example embodiments described below relate to ring resonators comprising two coupled ring waveguides configured to flatten the mode dispersion curve and thus enable the generation of expanded and/or more uniform frequency combs. Prior to describing the example embodiments, it may be convenient to introduce a few other dispersion related parameters, and to describe their relation to measurable quantities and other dispersion characteristics conventionally used in the art.

Firstly, mode dispersion coefficients $D_k$, k=1, 2, ... may be defined as coefficients in a Taylor expansion of the mode frequency function $v(m)=v_m$:

$$v_m - v_0 = D_1 m + \frac{1}{2!}D_2 m^2 + \frac{1}{3!}D_3 m^3 + \frac{1}{4!}D_4 m^4 \ldots \quad (2)$$

From equations (1) and (2), the FSR at the center (pump) frequency $v_0$, $FSR_0=0.5 \cdot [v_1 - v_{-1}]$, and the integrated dispersion $D_{int}(m)$ may be expressed as follows:

$$D_1 = F_{SR0}, \quad (3)$$

$$D_{int}(m) = \frac{1}{2!}D_2 m^2 + \frac{1}{3!}D_3 m^3 + \frac{1}{4!}D_4 m^4 \ldots \quad (4)$$

The coefficients $D_2$, $D_3$, and $D_4$ represent values of the second-order dispersion (SOD), the third-order dispersion (TOD), and the fourth-order dispersion (FOD), respectively, at the optical frequency $v_0$. The SOD coefficient $D_2$ relates to the group velocity dispersion $(GVD) \beta_2 = d^2\beta(\omega)/d\omega^2$ at $\omega=2\pi v_0$, through the following equation (5), $$D_2 = -\frac{2\pi \beta_2}{\beta_1^3 L^2} \quad (5)$$

Here $\beta(\omega)$ is the propagation constant in the ring waveguide of an optical wave at the angular frequency $\omega=2\pi v$, also known as the wavenumber, L is the length of the ring waveguide, $L=2\pi R$ for a circular ring waveguide of radius R. Parameter $\beta_1 = d\beta(\omega)/d\omega$ is the inverse of the group velocity $v_g$ of the light in the waveguide at $v_0$. It relates the FSR at $v_0$, $F_{SR0}$, to the total resonator length L, $\beta_1 = (L \cdot FSR_0)^{-1}$.

The GVD may also be defined as a derivative with respect to wavelength, as a GVD parameter $D_\lambda = 2\pi c/\lambda^2 \beta_2$, which is sometimes measured in ps/(nm·km); here c is the speed of light in vacuum. Accordingly, the second-order dispersion coefficient $D_2$ may be expressed via the GVD $\beta_2$ and the GVD parameter $D_\lambda$ as follows:

$$D_2 = -2\pi L F_{SR}^3 \beta_2 \quad (6)$$

$$D_2 = \frac{1}{c} \lambda^2 L F_{SR}^3 D_\lambda \quad (7)$$

The second-order dispersion coefficient $D_2$ given by equations (5)-(7) is measured in units of frequency. It may be expressed in dimensionless units by normalizing it to the nominal FSR of the resonator $FSR_0$ or the spectral width $\delta$ of the resonator modes.

The k-th order dispersion coefficients $D_k$, k=2, 3, ... K at $v=v_0$ may be estimated by fitting a measured mode dispersion function $D_{exp}(m)$ to a K-th order polynomial in the form of a truncated Taylor series $\Sigma_{k=0}^{K} 1/k! D_k m^k$. These coefficients may then be re-used e.g. to estimate a spectrum $D_j(m)$ of a j-th order dispersion coefficient $D_j$, j<K, using $D_{i+j}$ in the i-th term of the Taylor series:

$$D_j(m) = \sum_{i=0}^{K} \frac{1}{i!} D_{i+j} m^i \quad (8)$$

For example, the SOD spectrum $D_2(m)$ may be estimated from known dispersion coefficients $D_2$, $D_3$, $D_4$, and $D_5$ at the reference mode $v_0$, $D_k = D_k(m=0)$, as $$D_2(m) \approx D_2 + D_3 \cdot m + \frac{1}{2}D_4 m^2 + \frac{1}{6}D_5 m^3 \quad (9)$$

The GVD spectrum $D_\lambda$ may be estimated, for example, according to an equation (10), $$D_\lambda = \frac{1}{L} \frac{\partial}{\partial \lambda}\left(\frac{1}{FSR(\lambda)}\right), \quad (10)$$

by computing the FSR of the resonator from the measured mode frequencies $v_m$, and estimating the rate of change of an inverse thereof with wavelength. The spectrum $D_2(m)$ may then be estimated according to equation (7). The notations $D_2(vm)$, $D_2(\lambda m)$, and $D_2(m)$ may be used herein to describe the SOD of the POR as function of the mode frequency, mode wavelength, and mode number, respectively, which may have different functional forms.

Example embodiments described below relate to planar optical resonators (PORs) formed with two or more coupled optical waveguide rings nested one inside the other, which are configured to provide a flattened mode dispersion spectrum in a vicinity of a target operating wavelength. In some embodiments, the target operating wavelength may for example be in a range from about 0.8 microns (μm) to about 1.6 μm, although it may also be outside of this range in other embodiments, e.g. in the 0.4 μm to 2 μm range as a non-limiting example. The optical waveguides are supported by planar substrates, and have optical cores disposed along a substantially planar surface of a substrate. Here the expression "substantially planar" may encompass slightly bent substrates or surfaces, normal variations in layer thickness during microfabrication, and surfaces with integrated optical waveguides and/or integrated electronic devices therealong. The substrate may have a cladding portion adjacent to the substantially planar surface along which the optical core is disposed. The cladding portion has an index of refraction that is lower than that of the optical cores of the waveguides.

Figure 2A:
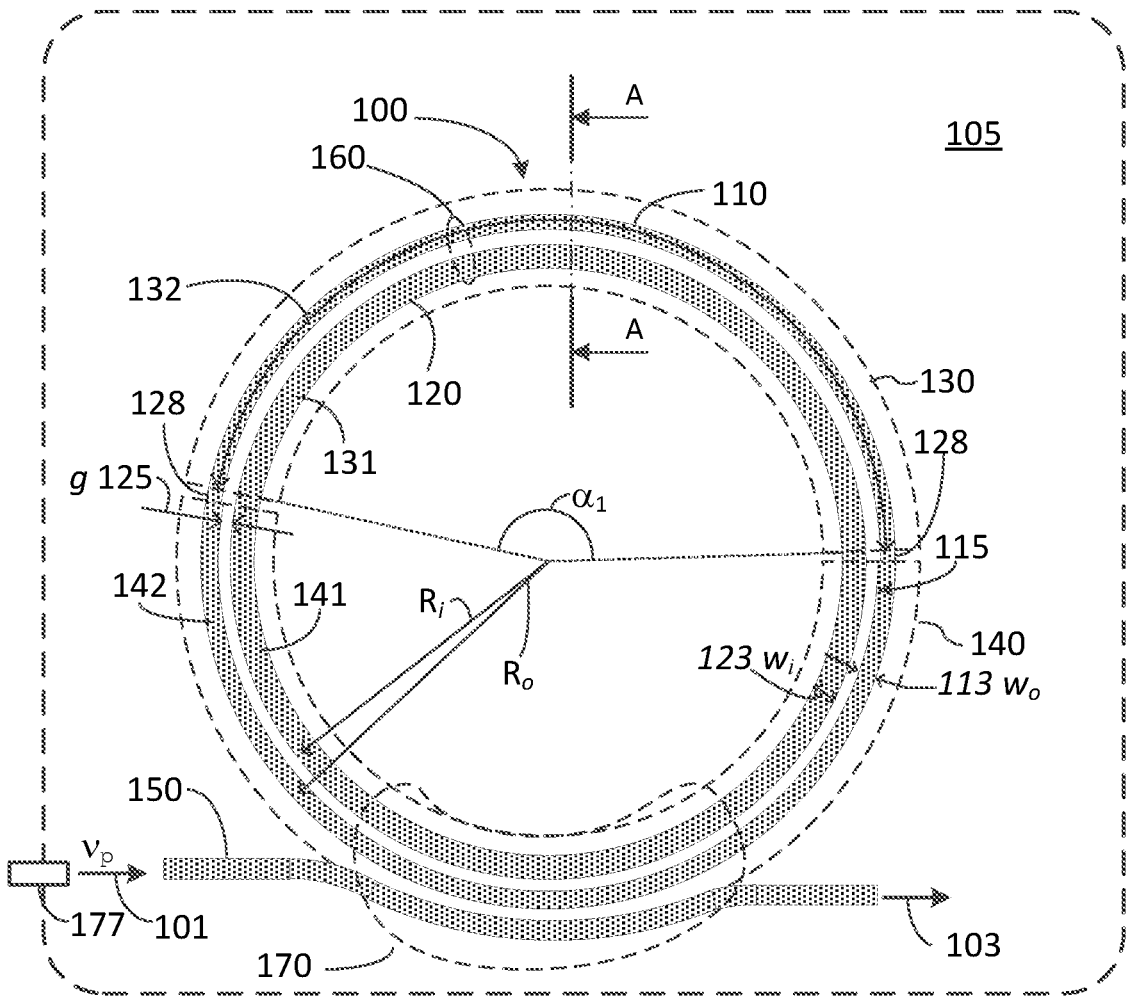
FIG. 2A is a schematic plan view of a PIC including a dispersion-managed planar optical resonator (POR) coupled to a bus waveguide.

FIG. 2A schematically illustrates, in a plan view, an example photonic integrated circuit (PIC) that includes a planar optical resonator (POR) 100 coupled to a bus waveguide 150 in a bus coupling region 170. In operation, input light 101 at a pump optical frequency $v_p$ may be injected into one end of the bus waveguide 150 and optically coupled into the POR 100 in the bus coupling region 170. Also, in the bus coupling region 170, a fraction of light propagating in the POR 100 is in turn optically coupled into the bus waveguide 150, and received from the other end thereof as output light 103. In some embodiments, evanescent optical coupling may be used to couple the bus waveguide 150 and the POR 100. In some embodiments, a multi-mode interference (MMI) coupler may be used to couple the bus waveguide 150 and the POR 100. The pump light 101 may be generated, for example, by a suitable pump laser 177, for example but not exclusively by a high-power single-frequency laser diode.

The POR 100 is configured to have a flattened mode dispersion spectrum in a spectral region near the pump optical frequency $\nu_p$, with the flattened dispersion region that may be wide enough to include 10 or more resonance frequencies of the POR. In some embodiments, the magnitude $|D_{int}(m)|$ of the integrated dispersion of the POR may remain within 0.4 GHz across a spectral region having a width of about 2% of the target operating optical frequency of the resonator. In some embodiments, for example where the pump wavelength $\lambda_p$ is in the 1.3-1.55 micrometer (μm) wavelength range, the magnitude $|D_{int}(m)|$ of the integrated dispersion of the POR may remain as low as 0.5 GHz or less across a spectral region around the pump frequency $\nu_p$ that is at least 4 THz wide, or at least 6 THz wide, or at least 8 THz wide in some embodiments. When the pump power is sufficiently high and the pump optical frequency $\nu_p$ is tuned sufficiently close to one of the POR resonances, an optical frequency comb with a flattened-top power spectrum may be parametrically generated in the POR 100 and comprised in the output light 103.

Figure 2B:
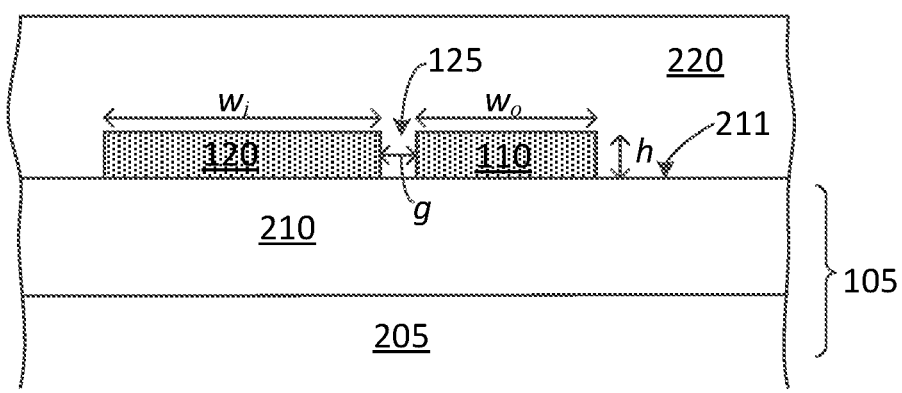
FIG. 2B is a schematic diagram illustrating a cross-section of the two optical waveguide cores of the POR of FIG. 2A.

The POR 100 includes a first optical waveguide core 110 forming an outer ring of the POR, and a second optical waveguide core 120 forming an inner ring of the POR that is disposed within the outer ring. The first optical waveguide core 110 may also be referred to as the outer waveguide core 110, and the second optical waveguide core 120 may also be referred to as the inner waveguide core 120. In the example illustrated in FIG. 2A the inner and outer rings are concentric and circular. FIG. 2B illustrates, in an expanded view, an example partial cross-section of the PIC through the optical waveguide cores 110, 120 at some location along the perimeter of the POR, for example along a line "A-A". The optical waveguide cores 110, 120 are at least partially separated by a gap 125 and extend side by side along a planar surface 211 of a substrate 105. The width g of the gap 125 may be sufficiently small to allow for evanescent optical coupling between adjacent segments of the waveguide cores 110, 120 in the operating wavelength range of the PIC. In example embodiments the gap width g is at least smaller than $\lambda_0/n_{c1}$, where $\lambda_0$ is a wavelength of input light and $n_{c1}$ is a refractive index of a medium within the gap, which may be e.g. silicon dioxide or air as non-limiting examples, or any other suitable material having a smaller refractive index than the material or materials of the optical waveguide cores. The bus waveguide 150 may be an integrated planar optical waveguide extending along the planar surface 211 of the substrate 105, as a part of the same PIC. In other embodiments, the bus waveguide 150 may be, for example, an optical fiber arranged to be evanescently coupled to one of the inner and outer waveguides cores from the top.

The substrate 105 may include a cladding layer 210 upon which the optical waveguide cores 110, 120 are disposed. The cladding layer may be supported by a substrate base 205. In some embodiments a top cladding layer 220 may be provided covering the optical waveguide cores 110 and 120. In the illustrated embodiment the optical waveguide cores 110 and 120 are strip waveguide cores having generally different widths 113 $w_i$ and 123 $w_o$, respectively, and a same height h. In other embodiments the inner and outer waveguide cores 120, 110 may be shaped differently. For example, in some embodiments the optical waveguide cores 110, 120 may have different heights, and/or be ridge waveguide cores, with a thin layer of the core material remaining in the gap 125 between the optical waveguide cores 110, 120, and possibly also at opposite sides thereof.

By way of example, the optical waveguide cores 110, 120 may be formed from a layer of silicon nitride ($Si_3N_4$) disposed over a silicon dioxide ($SiO_2$) cladding 210 that is in turn supported by a silicon (Si) substrate 205. The top cladding layer 220 may also be comprised of $SiO_2$. The widths 113, 123 of the optical waveguide cores may be for example in the range from about 0.5 μm to about 3.5 μm, for a height of about 0.3-0.6 μm. In some embodiments, the core's height may be up to 1 μm. In at least some embodiments, the height of the cores may be limited to avoid stress-related effects. The size, i.e. widths and/or heights, of the waveguide cores may be different in other material systems. Advantages of using silicon nitride ($Si_3N_4$) for the inner and outer optical waveguide cores 120, 110 include its compatibility with CMOS processing, and low optical loss that enables a high resonator Q-factor, which may be as high as $\sim 10^5$-$10^7$ or greater. Furthermore, silicon nitride has a relatively high nonlinear refractive index coefficient, which is about an order of magnitude higher than that of silicon dioxide, and a relatively large index contrast (Δn~0.5) relative to silicon dioxide, which enables a high degree of optical confinement in the optical core where the non-linear effects are stronger, a combination that is favorable for a high-efficiency parametric frequency comb generation at moderate pump optical power levels.

The optical waveguide cores 110, 120 may each support a low-loss optical mode, which may be denoted as $E_o=E_o(r, \nu)$ and $E_i=E(r, \nu)$, respectively, in a range of optical frequencies $\nu$ around the pump frequency $\nu_p$; here r denotes a radial coordinate. The modes $E_o$ and $E_i$ may for example be fundamental TE modes of the outer and inner optical waveguide cores in the absence of coupling therebetween, respectively. In other embodiments they may be TM modes. If the propagation constant $\beta_i(\nu)$ of the inner-waveguide mode E differs significantly from the propagation constant $\beta_o(\nu)$ of the outer-waveguide mode $E_o$, the modes $E_o$ and $E_i$ may be substantially decoupled.

Figure 3A:
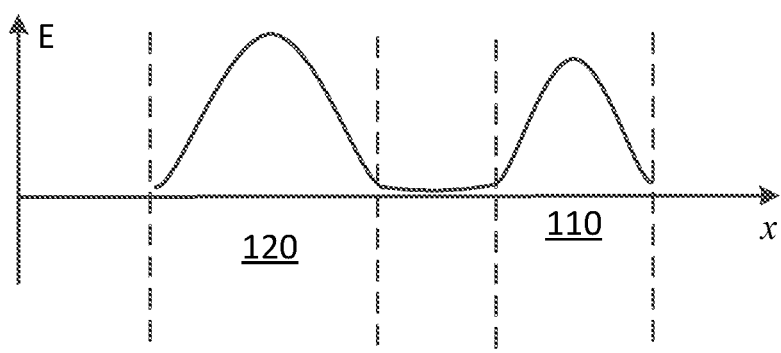
FIG. 3A is a schematic diagram of a symmetric mode of the POR of FIG. 2A.
Figure 3B:
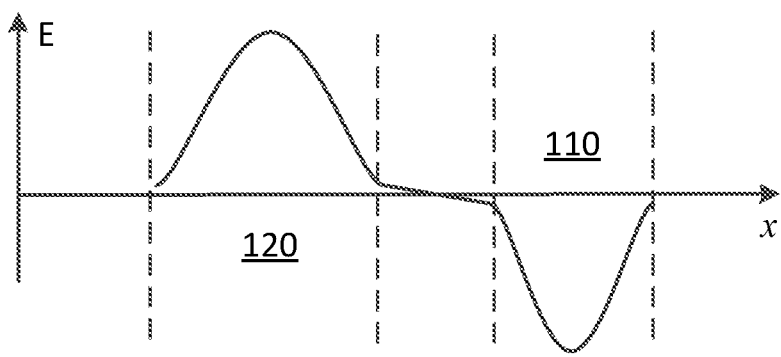
FIG. 3B is a schematic diagram of a antisymmetric mode of the POR of FIG. 2A.

The optical waveguide cores 110 and 120 may be configured so that they become resonantly coupled at a chosen optical frequency $\nu_c$, and the modes $E_o$ and $E_i$ become phase-synchronized at that optical frequency $\nu_c$, which may be referred to as a coupling frequency or an anti-crossing frequency. The propagation of light in the optical waveguide cores 110 and 120 under the resonant coupling condition may be described in terms of hybrid modes of a dual optical waveguide 160 that includes the inner and outer optical waveguide cores 110 and 120. The dual optical waveguide 160 may also be referred to as the compound optical waveguide 160. One of these hybrid modes is symmetric with respect to the two optical waveguide cores 110 and 120 and the other hybrid mode is antisymmetric with respect to the two optical waveguide cores 110 and 120, as schematically illustrated in FIGS. 3A (symmetric mode) and FIG. 3B (antisymmetric mode). The antisymmetric mode may have anomalous dispersion (positive GVD/SOD parameters $D_\lambda$ and $D_2$) in a vicinity of the coupling optical frequency $\nu_c$, which is conducive to the parametric frequency comb generation via nonlinear FWM.

Near the coupling optical frequency $\nu_c$ the GVD spectrum of the antisymmetric mode may be approximately parabolic, resulting in a significant integrated dispersion $D_{int}(m)$ (mode de-tuning) for modes away from the GVD peak. This may limit the spectral width of the frequency comb when there is only one coupling frequency in the spectral range of interest, e.g. in the vicinity of a pump frequency. Example embodiments described herein may have inner and outer optical resonator rings that are constructed to be resonantly optically coupled at two optical frequencies, or equivalently in two distinct spectral regions. When suitably positioned at opposite sides of the pump frequency, the two spectral regions of resonant optical coupling may result in a flattened GVD spectrum in the vicinity of the pump frequency $v_p$, which may enable generating a frequency comb spectrum having a flattened and/or broadened central portion. The pump frequency $v_p$ corresponds to a target central frequency $v_0$ of the frequency comb spectrum; it may also be referred to as the operating frequency of the POR, with a corresponding pump wavelength $\lambda_p$ referred to as the operating wavelength of the POR.

Figure 4A:
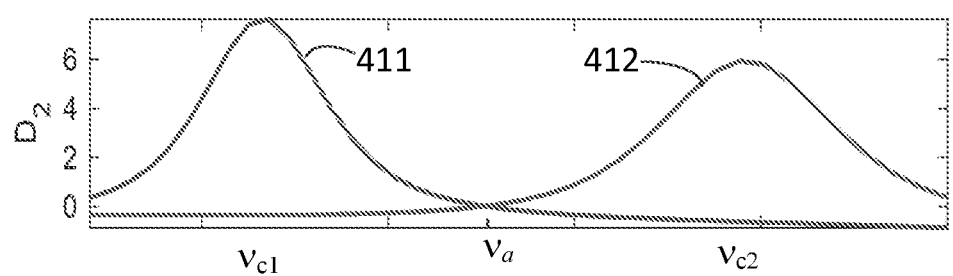
FIG. 4A is a graph illustrating spectral peaks in the second-order dispersion (SOD) spectrum of a POR in which the inner and outer waveguides are resonantly coupled at two different frequencies.

Referring to FIG. 4A, the waveguide cores 110, 120 may be configured to provide a SOD spectrum $D_2(v_m)$ having two anomalous-dispersion peaks 411 and 412 in the optical spectral range of interests, a first peak 411 centered at a first optical frequency $v_{c1}$ and a second peak 412 centered at a second optical frequency $v_{c2}$. These two peaks, which may be referred to as the SOD peaks and/or the GVD peaks, may be associated for example with the two optical waveguide cores 110 and 120 being resonantly coupled in two separate wavelength regions, or equivalently two separate optical frequency regions centered at the separate peak optical frequencies $v_{c1}$ and $v_{c2}$, respectively, which give rise to the GVD or SOD peaks 411 and 412, respectively. The first and second peak optical frequencies $v_{c1}$ and $v_{c2}$ may be referred to as the optical coupling frequencies or the GVD peak frequencies; they may be selected so that tails of the two GVD peaks 411, 412 combine to give a flattened and close to zero SOD in some frequency range between the two peak optical frequencies $v_{c1}$ and $v_{c2}$. By configuring optical waveguide cores 110, 120 of the POR 100 so that the two peak optical frequencies $v_{c1}$ and $v_{c2}$ lie on opposite sides of a target pump frequency $v_p$, or a target comb central frequency $v_0$, and at suitable distances therefrom, this frequency range of low integrated dispersion may be made suitably wide.

Figure 4B:
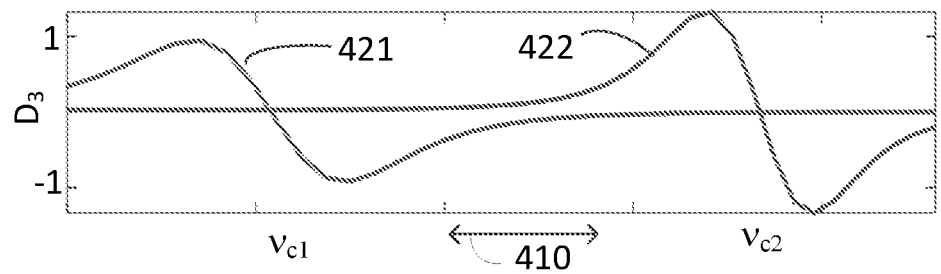
FIG. 4B is a graph illustrating spectral peaks in the third-order dispersion (TOD) spectrum of the POR in which the inner and outer waveguides are resonantly coupled at two different frequencies.

Referring now also to FIG. 4B, the SOD peaks at the optical coupling frequencies $v_{c1}$ and $v_{c2}$ may be associated with zeros in spectra of corresponding TOD components 421 and 422. The TOD spectra 421 and 422 have opposite signs in a spectral region between the coupling optical frequencies $v_{c1}$ and $v_{c2}$, which may result in a near-cancellation of the TOD at some optical frequency $v_a$ between the two optical coupling frequencies where the SOD is also small. The contribution of the fourth-order dispersion (FOD) $D_4(m)$ may therefore become dominant, providing for a low integrated dispersion $D_{int}(m)$ with an approximately quartic spectrum shape in some spectral region 410 between the peak frequencies $v_{c1}$ and $v_{c2}$. This may facilitate a parametric generation of a wider and more uniform frequency comb when the POR is optically pumped at a pump frequency $v_p \cong v_a$ in the region 410 of flattened dispersion between the two peaks, $v_{c1} < v_p < v_{c2}$.

Figure 5:
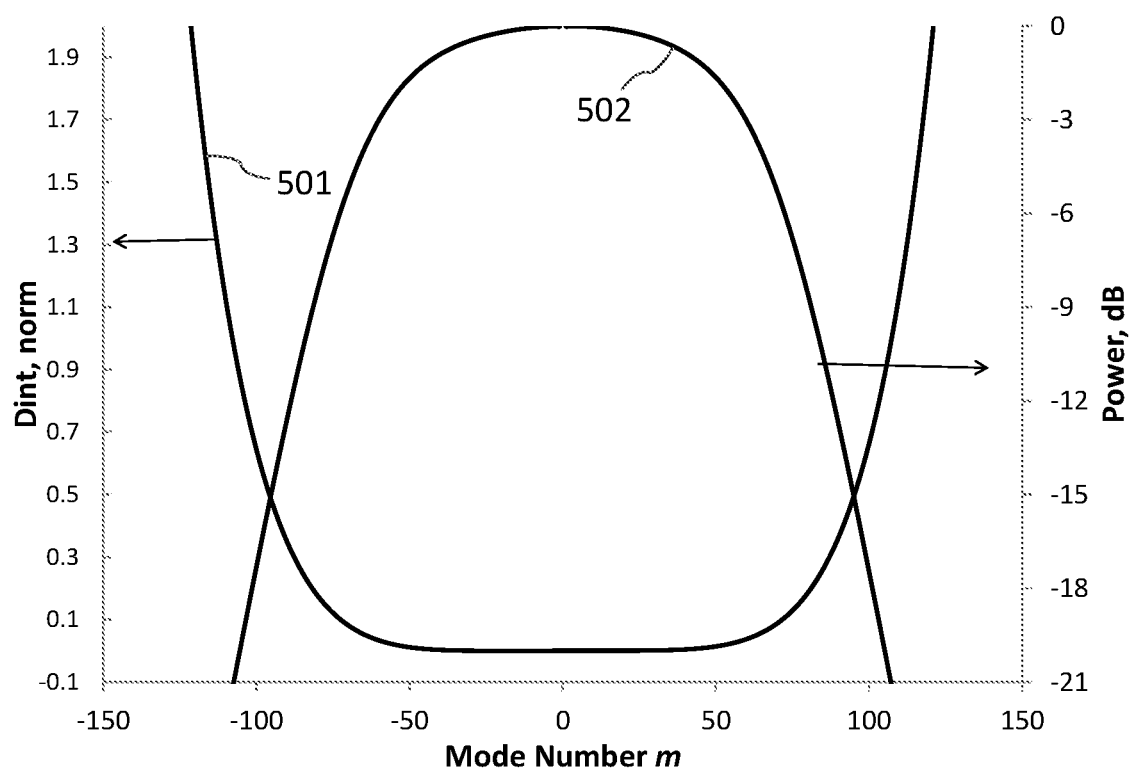
FIG. 5 is a graph schematically illustrating example integrated dispersion $D_{int}$ and comb power spectra, as functions of mode index, of a POR in which the inner and outer waveguides are resonantly optically coupled at two different coupling frequencies.

FIG. 5 schematically illustrates an example integrated dispersion spectrum $D_{int}(m)$ 501, which the inventors believe may be possible to achieve for an embodiment of POR 100 with a 100 GHz nominal FSR. The integrated dispersion spectrum $D_{int}(m)$ is shown as a function of a mode index m relative to a central optical frequency $v_0 \cong v_a$, and normalized to the nominal FSR. The flattened bottom portion of the $D_{int}$ spectrum 501 corresponds to the region 410 in FIG. 4B, where the TOD contributions from the two SOD peaks may approximately cancel out. FIG. 5 also shows a corresponding optical power spectrum 502 of a frequency comb, which the inventors believe may be generated by the example POR having the shown $D_{int}$ spectrum 501, when the POR is optically pumped at a suitable pump power and a pump frequency tuned to $v_0$.

There may be an optimal value of frequency spacing $v_{12} = (v_{c1} - v_{c2})$ between the two peak optical frequencies $v_{c1}$ and $v_{c2}$, beyond which the integrated dispersion $D_{int}$ may start rising in magnitude in a middle region between the two peaks in a vicinity of the target central optical frequency $v_0$. In some embodiments, a wavelength spacing $\lambda_{12} = (\lambda_{c1} - \lambda_{c2})$ between two coupling wavelengths $\lambda_{c1} = c/v_{c1}$ and $\lambda_{c2} = c/v_{c2}$ corresponding to the two peak optical frequencies $v_{c1}$ and $v_{c2}$ may be 20 nm or greater, or typically in a range from about 40 nm to about 400 nm, or from about 100 nm to about 300 nm. In the example shown in FIG. 5, the frequency spacing $v_{12} = (v_{c1} - v_{c2})$ between the two peak optical frequencies contains about 190 modes of the resonator, which corresponds to the wavelength spacing $\lambda_{12}$ of about 110 nm at $\lambda_0 \sim 1310$ nm.

One way to provide a SOD spectrum $D_2(v_m)$ of the POR with two or more peaks is to have two or more sections in the POR, also referred to herein as resonator sections, where the inner and outer optical waveguide cores are resonantly optically coupled at different optical frequencies, or equivalently in two or more separate wavelength regions. For example, two SOD peaks may correspond to two sections of the POR were at least one of the inner and outer waveguide cores differ in size, e.g. has different values of its width and/or height; in these sections the mode coupling between the inner and outer optical waveguide cores may happen at somewhat different optical coupling frequencies $v_{c1}$ and $v_{c2}$, or equivalently in separate wavelength regions. In embodiments described below, a width of at least one of the optical waveguide cores varies such that the optical waveguide cores resonantly optically couple at two separated wavelength regions.

Referring back to FIG. 2A, in the illustrated example POR 100 includes a first resonator segment 130 and a second resonator segment 140, each of which including evanescently coupled segments of the inner and outer waveguide cores 120, 110 extending alongside each other. In the illustrated example, the first resonator segment 130 of the POR 100 includes adjacent core segments 131 and 132, and the second resonator segment 140 includes adjacent core segments 141 and 142. In the illustrated embodiment, resonator sections 130, 140 are formed by continuous segments of the two optical waveguide cores that extend adjacently therealong, with their ends aligned, and may be referred to as resonator segments 130, 140. The width of at least one of the inner and outer waveguide cores 110, 120 changes from section to section, so that it has a first width $w_1$ in the first section 130 and a second width $w_2$ in the second section 140. The second width $w_2$ differs from the first width $w_1$ by a first non-zero width difference $\Delta w_1$, $w_2 = w_1 + \Delta w_1$. For a chosen general configuration of the POR, such as its size, shape, waveguide geometry, and materials, the magnitude of the first width difference $\Delta w_1$ may be chosen depending on a target coupling frequency spacing $v_{12} = |v_{c2} - v_{c1}|$ between the coupling frequencies and the wavelength range of operation. The width difference $\Delta w_1$ may typically be at least equal to some minimal value, denoted as $\Delta w_{1min}$, which may be about 40 nanometers in example embodiments. The change in the optical waveguide core's width from section to section, or from one segment of the core to the next, may be gradual to reduce reflections, over a length of several wavelengths, or from several microns to tens of microns in example embodiments.

Peaks in the SOD spectrum of the POR at target coupling frequencies $v_{c1}$ and $v_{c2}$ may appear for example when the inner and outer optical waveguide cores 120, 110 are configured so that their optical path lengths (OPLs) within e.g.

the first and second sections 130 and 140 become equal at these two different optical frequencies:

$$OPL_{1i}(v_{c1}) = OPL_{1o}(v_{c1}) \quad (11)$$

$$OPL_{2i}(v_{c2}) = OPL_{2o}(v_{c2}) \quad (12)$$

where $OPL_{1i}(v)$ and $OPL_{1o}(v)$ are the optical path lengths of the segments of the inner waveguide core 120 and the outer waveguide core 110, respectively, within the first resonator section 130, and $OPL_{2i}(v)$ and $OPL_{2o}(v)$ are the optical path lengths of the segments of the inner waveguide core 120 and the outer waveguide core 110, respectively, within the second resonator section 140.

The OPLs of the inner and outer waveguide core of uniform width within a k-th sector, k=1 or 2, may be estimated as $L_{ki} \cdot n_{ki}(v)$ and $L_{ko} \cdot n_{ko}(v)$. Here $n_{ki}(v)$ is an effective refractive index at the optical frequency $v$ of the inner waveguide core 120 within the k-th sector, $n_{ko}(v)$ is an effective refractive index at the optical frequency $v$ of the outer waveguide core 110 within the k-th sector, $L_{ki}$ and $L_{ko}$ are the physical length of the segments 131, 141 of the inner waveguide core 120 and the segments 132, 142 of the outer waveguide core 110 within the k-th sector, k=1 or 2. In embodiments where optical waveguide cores 110, 120 form circular concentric rings of radii $R_o$ and $R_i$, respectively, $L_{ki}/L_{ko} = R_i/R_o$.

In embodiments where the inner and outer waveguide cores 120, 110 of different size are substantially uniform within each section 130, 140, conditions (11) and (12) that are satisfied for two resonator sections at a wavelength $\lambda_c$, are also satisfied for sub-segments of the dual waveguide in the corresponding resonator sections at the same wavelength $\lambda_c$. Under these conditions light propagation constants $\beta_{in}(\lambda)$ and $\beta_{out}(\lambda)$ in the inner and outer core segments become suitably matched, so light of the wavelength $\lambda_c$ in the laterally adjacent segments of the inner and outer cores can co-propagate with a common wavefront, and can form, in a wavelength-selective manner, a hybrid mode having a substantial portion thereof within each core. As a result, the laterally adjacent segments of the inner and outer cores may become resonantly optically coupled at the wavelength $\lambda_c$. A change in the wavelength away from the wavelength of resonant coupling $\lambda_c$ causes the light to be confined predominantly in one of the inner or outer cores, depending on the sign of the wavelength change. In the case of concentric circular rings, co-propagation means a same angular velocity of optical wavefront in the two cores. In the case of straight core segments, co-propagation may mean a same propagation constant in each core.

Figure 6:
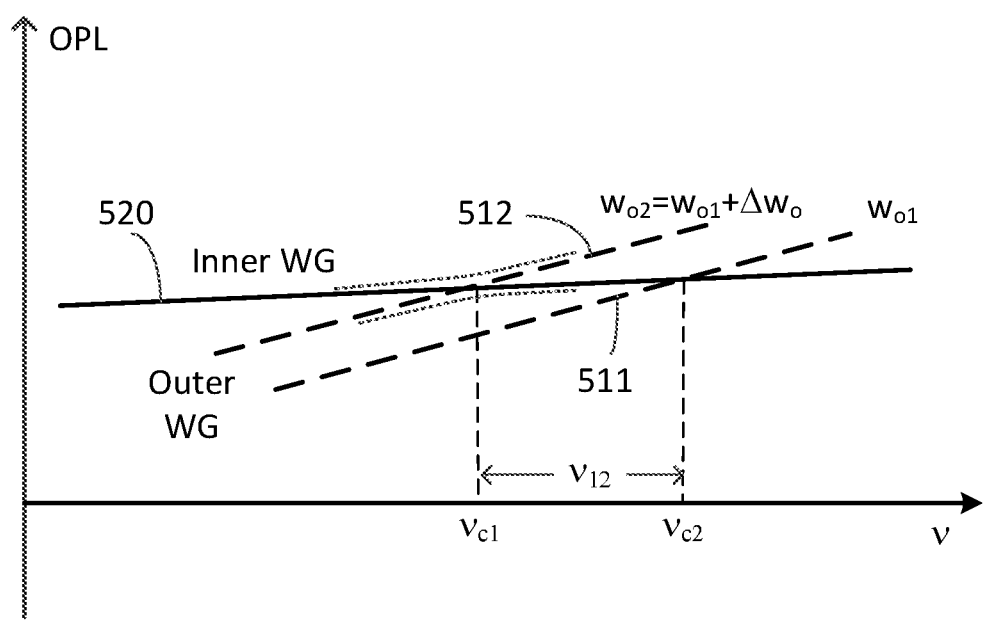
FIG. 6 is a graph schematically illustrating the crossings of optical path lengths (OPL) of laterally-adjacent segments of inner and outer waveguides for two widths of the outer waveguide core, giving rise to resonant optical coupling between the laterally-adjacent segments at two different optical coupling frequencies.

FIG. 6 schematically illustrates the OPLs of adjacent segments of the inner and outer waveguides of a same resonator segment, in the absence of coupling therebetween, for two different widths of the outer waveguide core, as functions of the optical frequency $v$. The OPL 520 of the inner waveguide segment is shown with a solid line, while the OPL of the outer waveguide is shown with dashed lines 511 and 512 for two different widths of the outer waveguide core, $w_{o1}$ and $w_{o2} = (w_{o1} + \Delta w)$. Crossings of line 520 with lines 511, 512 indicate conditions (11) and (12) of resonant optical coupling between the inner and outer waveguides. Changing the width 113 of the outer optical waveguide core 110 from $w_{o1}$ to $w_{o2} = w_{o1} + \Delta w_o$ shifts the optical frequency or resonant coupling by a frequency shift or spacing $v_{12}$, which in a first approximation may be proportional to $\Delta w_o$. The outer optical waveguide core 110 may be narrower than the inner optical waveguide core 120, to compensate for a difference in the lengths of the corresponding inner and outer segments within a same resonator segment or section. The effective refractive index of the outer waveguide having a narrower core may be more sensitive to changes in both the optical frequency and the waveguide core's width. Accordingly, the coupling frequency shift $v_{12}$ may be more sensitive to changes in the width of the outer optical waveguide core 110. Generally, the change in the width 113 of the outer optical waveguide core and/or the width 123 of the inner waveguide core for a target value of the resonant frequency spacing $v_{12}$ may be obtained by computer simulations, for example using commercially available software capable of simulating light propagation in planar optical waveguides.

In embodiments where optical waveguide cores 110, 120 form circular concentric rings of radii $R_o$ and $R_i$, respectively, $L_i/L_o = R_i/R_o$.

FIG. 2A illustrates an embodiment in which the POR is divided into two sections, or resonator segments, 130 and 140, each including laterally adjacent continuous segments of the inner and outer optical waveguide cores 120, 110 of uniform widths, which are subtended by a same angle, as seen from the common center of the rings. Waveguide tapers 128 may be provided between the resonator sections to optically and physically connect segments of the inner or outer waveguide core that change their width from resonator section to resonator section. In some embodiments, at least one of the waveguide tapers 128 may be in a region that is remote from the bus coupling region 170, for example at a distance therefrom of at least 20 microns, or at least 10% of a total length of the respective waveguide core. The outer core segments 132, 142 and the inner core segments 131, 141 may be of constant width and absent of tapering.

In the first resonator segment 130, the optical waveguide cores 110, 120 are constructed to support co-propagation therealong of light of a first wavelength $\lambda_{c1}$, while in the second resonator section 140 the optical waveguide cores 110, 120 are constructed to support co-propagation therealong of light of a second wavelength $\lambda_{c2}$, which differs from the first wavelength by a wavelength spacing $\lambda_{12}$. The spectrally-selective co-propagation of light in the two sections leads to resonant optical coupling between the inner and outer cores in the two resonator section at the respective first and second wavelengths.

In some embodiments, at least one of the resonator sections 130, 140 may include two or more resonator segments, or segments of the dual waveguide 160, that are not contiguous. For example, embodiments can be envisioned in which each of the two resonator sections 130, 140 is divided in two or more sub-sections, and the sub-sections of the first section 130 are interspersed with sub-sections of the second section 140. In other embodiments, one of the two resonator sections 130, 140 may be divided into two sub-sections separated by a third section of the POR in which at least one of the inner and outer waveguide differs in width from its segments in the first and second sections.

Figure 7A:
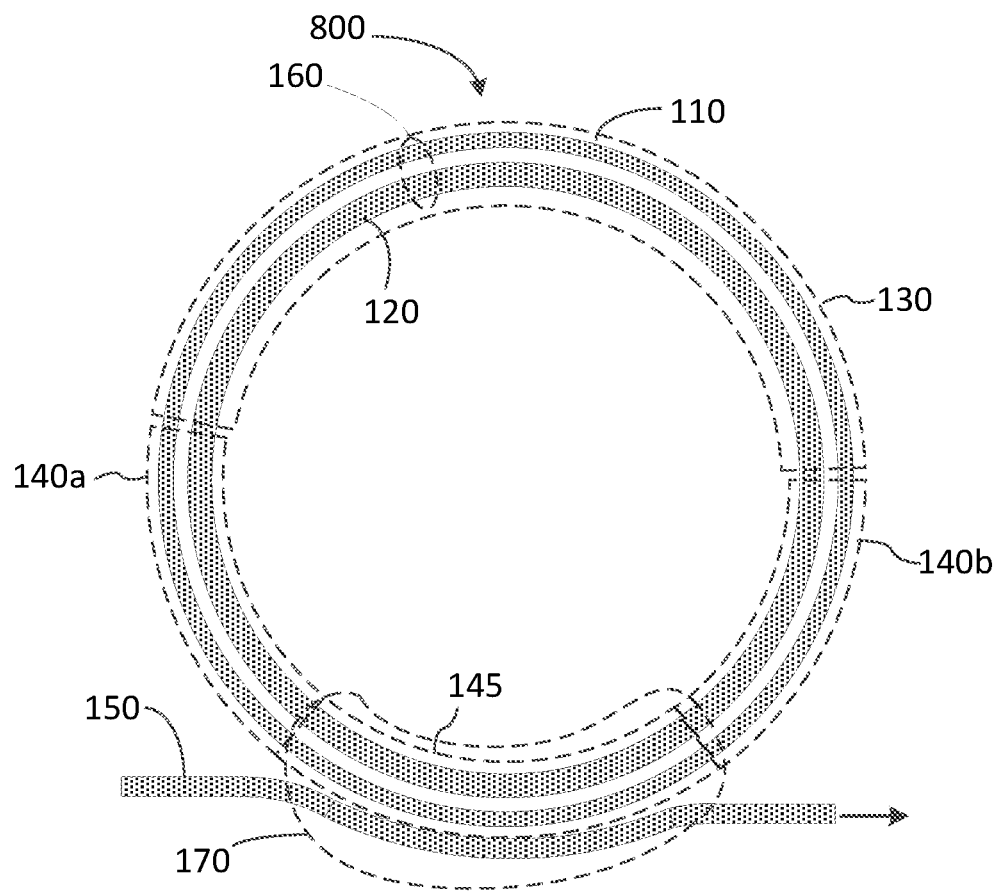
FIG. 7A is a schematic diagram illustrating a first example section layout of a multi-section POR having a bus coupling section.
Figure 7B:
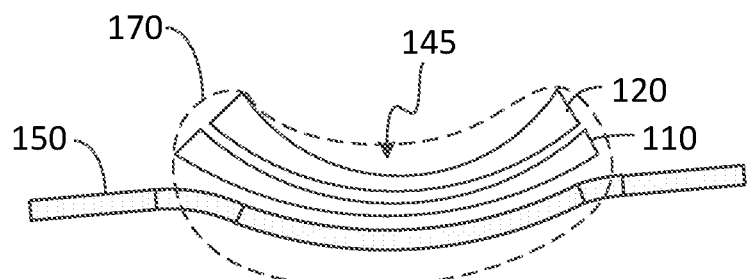
FIG. 7B is a schematic plan view of an example bus coupling section of a multi-section POR.
Figure 7C:
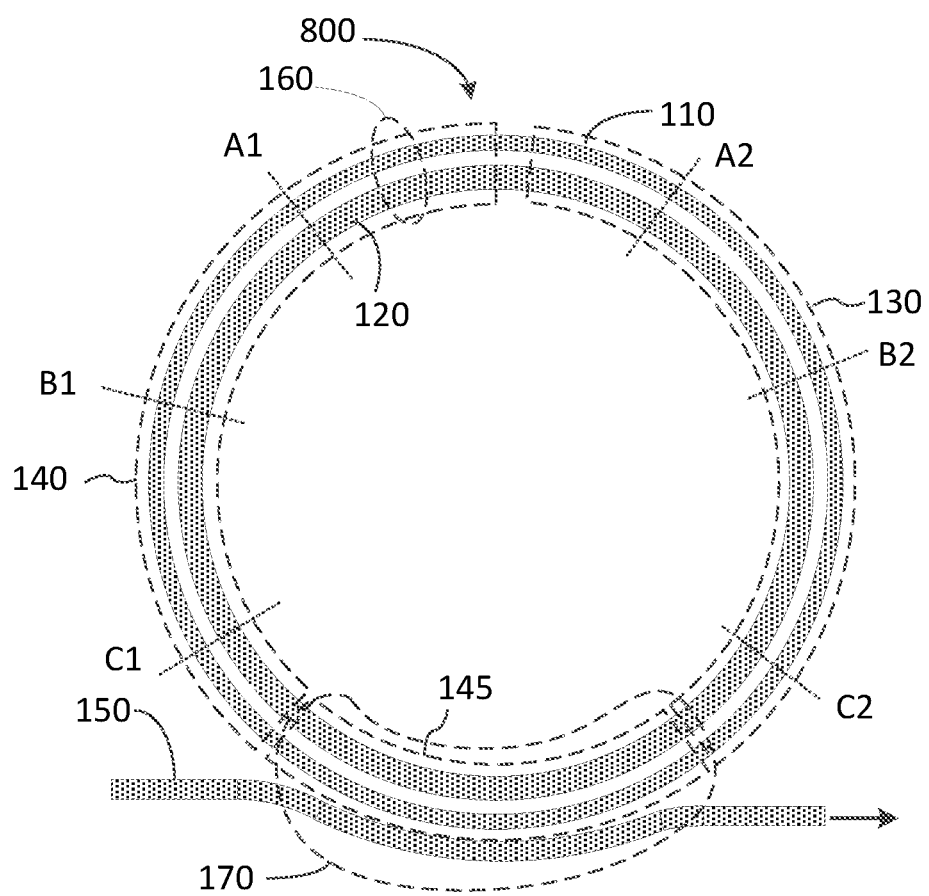
FIG. 7C is a schematic diagram illustrating a second example section layout of a multi-section POR having a bus coupling section.

FIGS. 7A and 7B illustrate an example POR 800 in which the second resonator section 140 is divided in two resonator segments 140a and 140b by a third POR section 145, which may also be referred to as the bus-coupling section. POR 800 may be an embodiment or modification of POR 100, and may be generally as described above, except that the outer and/or inner waveguide cores 110, 120 in the third POR section 145 may be configured to optimize optical coupling to the bus waveguide 150 in the bus coupling region 170. For example, the outer waveguide core 110 in the third POR section 145 may be configured to have a width that is approximately equal to the width of an adjacent section of the bus waveguide 150. In some embodiments, widths of the inner and outer waveguide cores 120, 110, and the gap therebetween, may be optimized to preferentially couple the pump light 101 into a hybrid mode of the compound waveguide 160 exhibiting anomalous dispersion, e.g. the antisymmetric mode. In some embodiments, both the inner waveguide core 120 and the outer waveguide core 110 may be tapered down in width toward the middle portion of the bus coupling region 170, as schematically illustrated in FIG. 7B. FIG. 7C illustrates an example embodiment in which two resonator sections 130, 140 are continuous resonator segments that connect to opposite ends of the bus coupling section 145 in the bus coupling region 170, and to each other in a region remote from the bus coupling region 170.

By way of example, optical waveguide cores 110, 120 may be silicon nitride cores that are approximately 500 nm think and are surrounded by silicon dioxide cladding. In an example embodiment of POR as illustrated in FIG. 7A operating in the 1.3 µm wavelength range, the radius of the outer ring waveguide 110 R=227.81 µm, corresponding to a nominal FSR of about 100 GHz. The length of the first section $l_1 \cong 620$ µm, the length of the second section $l_2 = (2\pi R - l_1 - l_{cpl})$, where $l_{cpl}$ is the length of the coupling section 145, which may be for example in the 20 to 40 µm range. The widths of the inner and outer optical waveguide cores are $w_{i1}=1.8$ µm, $w_{o1}=1.37$ µm respectively in the first resonator section 130, and are $w_{i2}=1.82$ µm, $w_{o2}=1.42$ µm, respectively, in both sub-sections of the second resonator section 140. Each waveguide core adiabatically tapers in width from each segment to the next in a length of 10 µm. The widths of the inner and outer waveguide cores in the bus-coupling section 145 are 1.8 µm and 1.1 µm, respectively. The gap between the inner and outer waveguide cores in the first section 130 is $g_1=0.6$ µm, and is $g_2=0.65$ µm in the coupling section 145 and the second section 140. The SOD spectrum of the POR in this embodiments may exhibit separate wavelength regions of resonant optical coupling, i.e. SOD peaks, at $\lambda_{c1}=1254$ nm and $\lambda_{c2}\cong 1370$ nm, corresponding to optical coupling frequencies in the first and second sections of the POR of about $v_{c1}\cong 239$ THz, and $v_{c2}\cong 219$ THz, spaced by $v_{12}\cong 19$ THz, with a central optical frequency $v_0$ of about 229.5 THz. The inventors believe that in this example, the magnitude of the integrated dispersion $|D_{int}(m)|$ may remain smaller than 100 MHz, or about 0.1% of the nominal FSR, across a spectral region that is ~6.5 THz wide, or about a third of the peak frequency spacing $v_{12}$. This spectral region is centered at $v_0$ and includes ~65 resonance frequencies $v_m$ of the resonator. The magnitude of the integrated dispersion $|D_{int}(m)|$ may remain smaller than 500 MHz, or about 0.5% of the nominal FSR, across about 8.5 THz, or about 44% of the peak frequency spacing $v_{12}$. When optically pump at the central optical frequency $v_0$ at a sufficient optical power level, the POR of this example is believed to be capable of generating a frequency comb spectrum that is substantially flat in the central region thereof, with a 1 dB frequency bandwidth of about 8.4 THz, and a 3 dB frequency bandwidth of about 11.8 THz, or about 61% of the peak frequency spacing $v_{12}$, containing about 118 spectral lines/resonance frequencies $v_m$.

In an example embodiment of POR as illustrated in FIG. 2A operating in the 1.3 µm wavelength range with ~500 µm silicon nitride cores and silicon dioxide cladding, the radius of the outer ring waveguide 110 R=50 µm, corresponding to a nominal FSR of about 462 GHz. In this example the inner optical waveguide core width in first and second resonator sections may be 1.45 µm, and 1.85 µm, adiabatically tapering from each segment to the next one in a length of 10 µm. The width of the outer waveguide core in both sections may be the same, $w_{o1}=w_{o2}=0.9$ µm; it is close to the width of the bus waveguide's core, so no separate bus coupling section needs to be provided. The gap between the inner and outer optical waveguide cores 0.6 µm and 0.5 µm in the respective sections. The length of the resonator sections are $l_1=95$ µm, and $l_2 \cong 2\pi R - l_1$. The SOD spectrum of the POR in this example may exhibit separate wavelength regions of resonant optical coupling, i.e. SOD peaks, at $\lambda_{c1}\cong 1430$ nm and $\lambda_{c2}\cong 1260$ nm, corresponding to optical coupling frequencies in the first and second sections of the POR of about $v_{c1}\cong 209$ THz, and $v_{c2}\cong 238$ THz, spaced by $v_{12}\cong 28$ THz, with a central optical frequency $v_0$ of about 229.5 THz. The inventors believe that in this example, the magnitude of the integrated dispersion $|D_{int}(m)|$ may remain smaller than 460 MHz, or about 0.1% of the nominal FSR, across a spectral region that is ~3.7 THz wide, which includes ~9 resonance frequencies $v_m$ of the resonator. When optically pump at the central optical frequency $v_0$ at a sufficient optical power level, the POR of this example is believed to be capable of generating a frequency comb spectrum that is substantially flat in the central region thereof, with a 1 dB frequency bandwidth of about 7.3 THz, and a 3 dB frequency bandwidth of about 12 THz.

It will be appreciated that particular values of various parameters of the POR given above, such as R, $w_{i1}$, $w_{o1}$, $l_1$, $w_{12}$, $w_{o2}$, $l_2$, $g_1$, $g_2$, are by way of example only, and may be selected differently in different embodiments, e.g. to provide a desired dispersion spectrum profile. For example, the lengths $l_1$ and $l_2$ of the first and/or second sections 130, 140 may be adjusted, e.g. to tune the magnitudes of the SOD peaks associated with the resonant coupling between the inner and outer waveguides. Resonant coupling may result in an optical crosstalk between the two waveguides, when light from the outer optical waveguide core 110 is coupled into the inner waveguide, while light from the inner waveguide 120 is coupled into the outer optical waveguide core 110. The length $l_b$ over which the transfer occurs is termed the beat length or the coupling length. In some embodiments, the length of each segment of the inner and outer optical waveguide core in the two sections 130, 140 of a POR may exceed a coupling length $l_b$ in the corresponding segment of the dual waveguide 160. In some embodiments, the resonator sections 130, 140 may each be at least equal in length, or exceed, the coupling length in the corresponding resonator section. In some embodiments, the first and second resonator sections 130, 140 may be at least 30 microns long, or at least 40 microns long, or at least 50 microns long, or at least 80 microns long. In some embodiments, the length of each inner and outer core segment in the first and second resonator sections may be at least a quarter of the total length of the corresponding waveguide core. In various embodiments, the total length of the inner and outer core segment in the first or second resonator sections may be at least 70% of the total length of the corresponding optical waveguide core, or at least 80% thereof.

In some embodiments, such as the examples described above, segments of the inner and outer waveguide cores 120, 110 within each of the first resonator section 130 and the second resonator section 140 may be uniform, i.e. constant, in width, at least along a 40 µm long portion of each of the respective segment. Expressions "uniform width" or "constant width" mean width variations resulting in a variation of the wavelength of resonant coupling between the waveguides that is at most half of a target value of the peak wavelength spacing $\lambda_{12}$, for example width variations within +\−15 nm.

In various embodiments, the difference in segment width Aw between segments of the inner and/or outer waveguide core in different resonator sections is expected to be at least 40 nm, or at least 50 nm in some embodiments, and may vary depending on the operating wavelength, the core and cladding material, the width of the waveguide, the desired spacing $\lambda_{12}$ between the peak wavelengths, etc. In example embodiments, the difference in segment width Aw may be in a 40 nm-800 nm range.

In some embodiments each of the inner and outer waveguide cores 120, 110 may have a substantially same width in at least three locations along the respective waveguides in each of the two sections of the POR, where the locations are at least 25 microns apart along the respective waveguide core. For example as illustrated in FIG. 7C, the inner waveguide core 120 may have a substantially same first inner core width $w_{i1}$ at three locations "A1", "B1", and "C1" within the first section 130 of the POR that are spaced apart along the waveguides by at least 25 microns, the outer waveguide core 110 may have a substantially same first outer core width $w_{o1}$ at the three locations "A1", "B1", and "C1" within the first section 130 of the POR, the inner waveguide core 120 may have a substantially same second inner core width $w_{i2}$ at three locations "A2", "B2", and "C2" within the first section 130 of the POR, the outer waveguide core 110 may have a substantially same second outer core width $w_{o2}$ at the locations "A2", "B2", and "C2" within the second section 140 of the POR, where at least one of the following conditions holds: $<w_{i1}>$ differs from $<w_{i2}>$ by at least 50 nm, and/or $<w_{o1}>$ differs from $<w_{o2}>$ by at least 40 nm. Here $<w>$ denotes an arithmetic average of a respective inner core width or outer core width at the three corresponding locations.

In some embodiments, the resonator sections 130, 140 may be configured to provide an integrated dispersion $D_{int}$ which magnitude does not exceed 400 MHz within an optical frequency bandwidth of 2% of the operating optical frequency $v_0$. In some embodiments, the resonator sections 130, 140 may be configured to provide an integrated dispersion $D_{int}$ which magnitude within an optical frequency bandwidth of 2% of the operating optical frequency does not exceed 200 MHz. In some embodiments, the resonator sections 130, 140 may be configured to provide an integrated dispersion $D_{int}$ which magnitude within an optical frequency bandwidth of 2% of the operating optical frequency does not exceed 100 MHz. In some embodiments, the resonator sections 130, 140 may be configured to provide an integrated dispersion $D_{int}$ which magnitude within an optical frequency bandwidth of 2% of the operating optical frequency does not exceed 50 MHz.

In some embodiments, the resonator sections 130, 140 may be configured to provide an integrated dispersion $D_{int}$ which magnitude does not exceed 0.5% of the FSR within a frequency band having a width of at least 20 FSR, or of at least 40 FSR, or of at least 60 FSR in some embodiments. In some embodiments, the resonator sections 130, 140 may be configured to provide an integrated dispersion $D_{int}$ which magnitude does not exceed 0.5% of the FSR within a frequency band having a width of at least 4 THz, or of at least 6 THz, or at least 8 THz for some embodiments.

In some embodiments, the width of at least one of the inner and outer optical waveguide core 120, 110 of the POR varies such that the integrated mode dispersion Dint of the POR does not exceed 0.5 GHz over an optical spectral range having a width of 4 THz.

In some embodiments, the width of at least one of the inner and outer optical waveguide core 120, 110 of the POR varies such that the integrated mode dispersion Dint of the POR does not exceed 0.5 GHz over an optical spectral range having a width of 6 THz.

In some embodiments, the width of at least one of the inner and outer optical waveguide core 120, 110 of the POR varies such that the optical waveguide cores resonantly optically couple at two separated wavelength regions. In some embodiments, center wavelengths of these regions may be spaced by at least 20 nm. In some embodiments, the wavelength spacing between the center wavelengths may be in the range between 40 nm and 400 nm, or typically in the range of about 80 nm to about 250 nm.

In some embodiments, sections of the POR may be configured to provide two peaks in the spectrum of SOD, or equivalently in the GVD spectrum of the POR, with a wavelength spacing therebetween $\lambda_{12}$ of 20 nm or more. In some embodiments, the wavelength spacing $\lambda_{12}$ between the two GVD or SOD peaks may be in the range of about 40 nm to about 400 nm, or in the range of about 80 nm to about 250 nm.

The spectra of integrated dispersion of the POR 100 in the spectral range of interest may be obtained, for example, by connecting a wavelength-tunable light source and a suitable optical spectrum analyzer to the input and output ends of the bus optical waveguide 150, and measuring the resonance wavelengths $\lambda_m$ or the corresponding resonance optical frequencies $v_m$. SOD spectra $D_2(v_m)$ may be obtained therefrom in a variety of ways, for example by fitting the measured spectrum of the integrated dispersion $D_{int}(vm)$ to a Taylor polynomial, and using the higher-order dispersion coefficients $D_k$, k=3, 4, 5, K obtained from the fitting to compute the SOD spectrum $D_2(v_m)$, e.g. as described above.

It will be appreciated that the example embodiments described above allow for various modifications. For example, FIGS. 2A, 7A, and 7C show embodiments where the inner and outer optical waveguide cores form two concentric circular rings. In other embodiments, the inner and outer optical waveguide cores may form closed nested loops of non-circular shapes, including but not limited to square loops and elliptical loops, with the inner and outer cores resonantly optically coupled to each other at different coupling wavelengths in different sections of the POR, e.g. as described above.

Figure 8A:
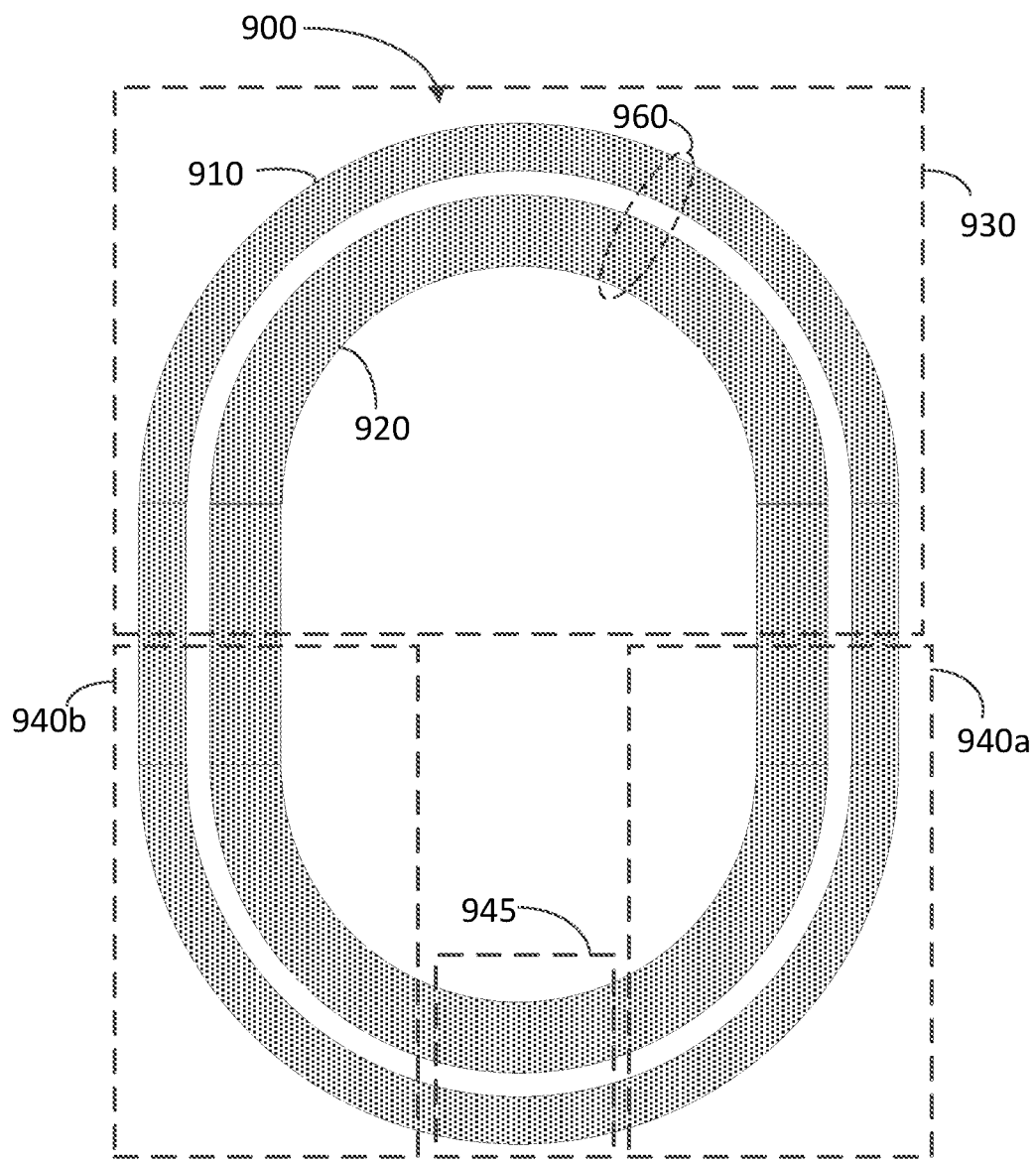
FIG. 8A is a schematic diagram illustrating a first example section layout of a multi-section race-track shaped POR having a bus coupling section.
Figure 8B:
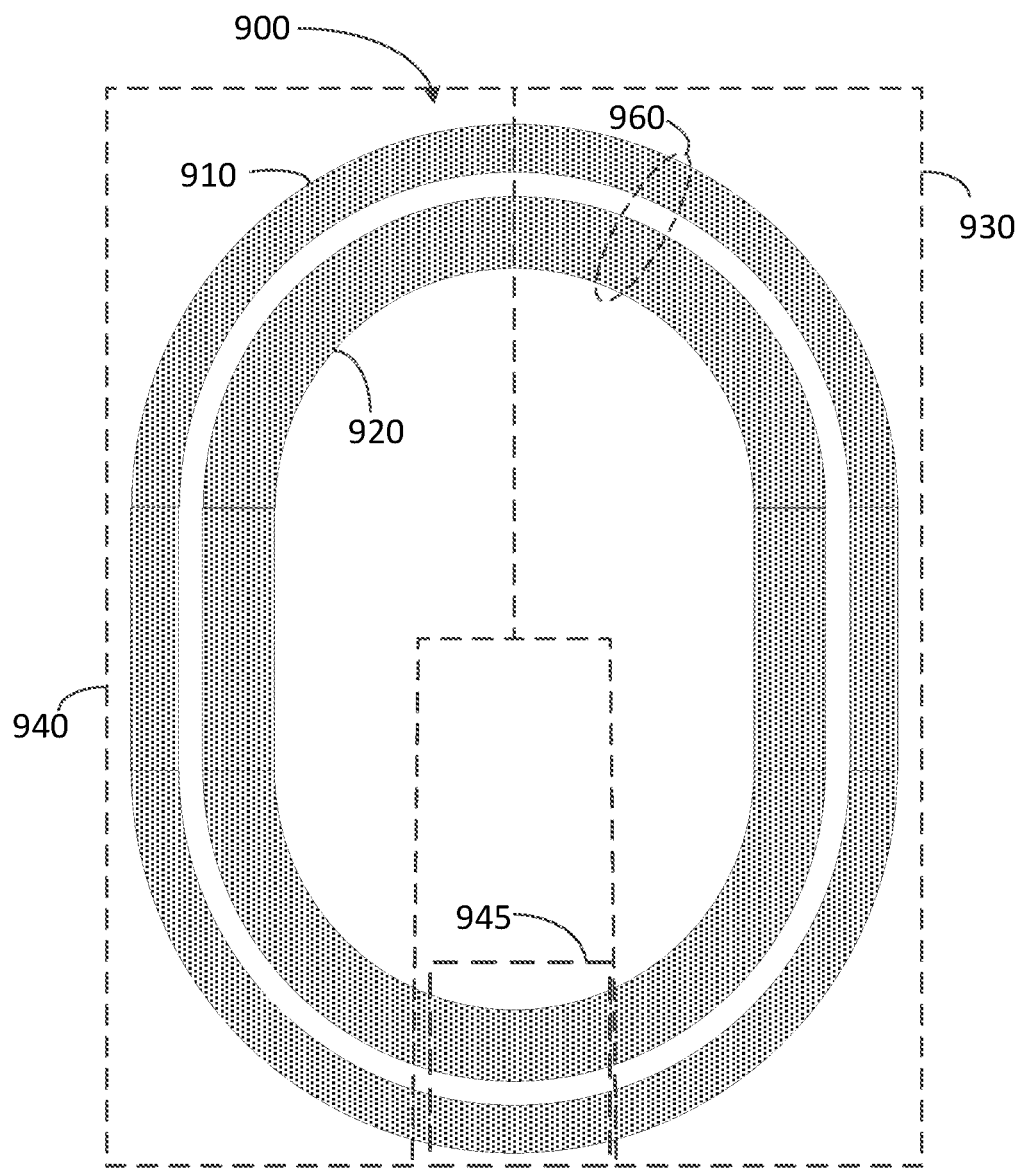
FIG. 8B is a schematic diagram illustrating a second example section layout of a multi-section race-track shaped POR having a bus coupling section.

FIG. 8A illustrates an example POR 900 composed of an outer optical waveguide core 910 and an inner optical waveguide core 920, which may be evanescently optically coupled to each other. Each optical waveguide core 910, 920 forms a closed loop having a so-called racetrack shape, in which two semi-circular waveguide core segments are connected by straight segments of the waveguide core. Except for their layout, the optical waveguide cores 910, 920 may be generally as described above with reference to optical waveguide cores 110 and 120. The outer optical waveguide core 910 may be narrower than the inner optical waveguide core 920, to at least partially equalize their optical lengths. In the illustrated embodiment POR 900 includes three sections, a first section 930, a second section that is divided into two sub-sections 940a and 940b and may be commonly referred to as resonator section 940, and a coupling section 945. The coupling section 945 may be as generally described above with reference to the coupling section 145. The optical waveguide cores 910, 920 may be configured to be resonantly optically coupled in the first section 930 at a first optical coupling frequency $v_{c1}$, and to be resonantly optically coupled in the second section 940 at a second optical coupling frequency $v_a$, e.g. as generally described above with reference to sections 130, 140 of POR 100 and 800. The width of at least one of the waveguide cores 910, 920 in the first section 930 may differ from its width in the second section 940 by a width difference Δw of at least 40 nm, or at least 50 nm in some embodiments. The separation $v_{12}$ between the coupling optical frequencies $v_{c1}$ and $v_{c2}$ may be adjusted by changing the width difference Δw, or by changing the length of the straight waveguide core segments within at least one of the resonator sections 930, 940. FIG. 9B illustrates an embodiment in which both the first and second resonator sections 930, 940 are continuous, and are separated at one end, near a bus optical waveguide (not shown), by the coupling section 945.

Example embodiments described above allow for numerous variations. For example, in some embodiments the inner and outer optical waveguide cores may be apart and locally decoupled in some region of the POR between the resonator sections providing resonant coupling. In some embodiments the POR may include one or more tuning elements such as resistive heaters for tuning the wavelength of the resonant coupling. In some embodiments the bus waveguide may be evanescently coupled to the POR at two separate locations so as to form a Mach Zehnder interferometer, e.g. for tuning the POR-bus coupling. In some embodiments, the height of the inner and/or outer optical waveguide core may change between resonator sections in addition to, or instead of, a change in the core width. In some embodiments two or more bus optical waveguides may be provided, for example one operating as an optical input and another as an optical output, with the POR having two distinct bus coupling regions. In some embodiments, the optical resonator may include two optical waveguide cores that extend in different planes along a plane surface of a substrate and form two vertically stacked and optically coupled rings; wherein the resonator comprises first and second resonator sections or segments, in each of which the two cores extend adjacently therealong and are evanescently coupled, wherein, in a first resonator section or segment, the two optical waveguide cores are configured to co-propagate light, and being resonantly optically coupled, at a first wavelength, and wherein, in a second resonator section or segment, the two optical waveguide cores are configured to co-propagate light, and being resonantly optically coupled, at a second, different, wavelength. The two cores may have different heights and/or different widths. In some of such embodiments, the height of at least one of the cores may change from the first resonator section or segment to the next. In some of such embodiments, the width of at least one of the cores may change from the first resonator section or segment to the next.

The present disclosure is not to be limited in scope by the specific embodiments described herein. Indeed, other various embodiments and modifications, in addition to those described herein, will be apparent to those of ordinary skill in the art from the foregoing description and accompanying drawings. For example, in some embodiments the inner and/or outer optical waveguide cores of the POR may comprise suitable materials other than $Si_4N_3$, including but not limited to silicon (Si), silicon-rich nitride ($Si_xN_y$), ultra-silicon rich nitride ($Si_7N_3$), aluminum nitride, lithium niobate, and other materials with sufficiently strong third-order optical Kerr nonlinearity. Embodiments may also be envisioned where optical materials with relatively lower Kerr non-linearity, such as e.g. silica, are used for the inner and/or outer optical waveguide cores, for example in application not requiring a high optical nonlinearity, e.g. optical filtering, or using high pump optical power.

Furthermore, features described with reference to a particular example embodiment may also be used in other embodiments, and all such and other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An apparatus comprising:
    an optical resonator comprising two optical waveguide cores extending over a planar surface of a substrate, the two optical waveguide cores comprising:
        a first optical waveguide core forming a first loop, and
        a second optical waveguide core forming a second loop; and
    a bus optical waveguide being optically coupled to the first optical waveguide core in a bus coupling region;
    wherein at least one of the two optical waveguide cores comprises first and second segments of different widths and a taper segment, the first and second segments being evanescently optically coupled therealong to adjacent segments of the other of the two optical waveguide cores, and wherein the taper segment is located in a region remote from the bus coupling region.

2. The apparatus of claim 1, wherein the first segment differs in width from the second segment by at least 40 nm.

3. The apparatus of claim 1 wherein the first and second segments and the adjacent segments are not tapered.

4. The apparatus of claim 1 wherein the first and second segments are each at least 40 microns long.

5. The apparatus of claim 1 wherein the first and second segments together have a length of at least 70% of a total length of the one of the two optical waveguide cores.

6. The apparatus of claim 1, wherein the first and second segments are resonantly optically coupled to the respective adjacent segments at two distinct coupling wavelengths.

7. The apparatus of claim 6, wherein the two distinct coupling wavelengths are adjacent to a target operating wavelength of the planar optical resonator, and are spaced apart by a wavelength spacing in a range from 40 nm to 400 nm.

8. The apparatus of claim 7, wherein the wavelength spacing is in a range from 40 nm to 400 nm.

9. The apparatus of claim 1, wherein the first and second segments are constructed such that light in the first segment and light in a corresponding one of the adjacent segments co-propagate therealong at a first wavelength, and light in the second segment and light in a corresponding one of the adjacent segments co-propagate therealong at a second wavelength distinct from the first wavelength.

10. The apparatus of claim 1 wherein the first and second segments are constructed such that an integrated dispersion of the planar optical resonator does not exceed 0.4 GHz across an optical spectral bandwidth of 2% of a target operating optical frequency of the planar optical resonator.

11. The apparatus of claim 1, wherein the two optical waveguide cores comprise silicon nitride.

12. An apparatus comprising:
a planar optical resonator comprising two optical waveguide cores located along a planar surface of a substrate, the two optical waveguide cores comprising:
a first optical waveguide core forming a first loop, and
a second optical waveguide core forming a second loop inside the first loop; and
a bus optical waveguide being optically coupled to the first optical waveguide core in a bus coupling region; and
wherein a width of at least one of the optical waveguide cores varies such that the two optical waveguide cores are resonantly optically coupled at two separate wavelength regions.

13. The apparatus of claim 12, wherein center wavelengths of the two separate wavelength regions are separated by at least 40 nm and at most 400 nm, and are located at opposite sides of a target operating wavelength of the planar optical resonator.

14. The apparatus of claim 13, wherein the at least one of the two optical waveguide cores comprises two segments that differ in width by at least 40 nm, wherein one of the two segments is resonantly optically coupled to a laterally adjacent segment of the two optical waveguide cores at a first one of the two separate wavelength regions, and the other one of the two segments is resonantly optically coupled to a corresponding laterally adjacent segment of the two optical waveguide cores at a second one of the two separate wavelength regions.

15. The apparatus of claim 14, wherein the two segments are connected with a taper segment, and wherein the two segments and laterally adjacent segments of the other of the two optical waveguide cores are not tapered.

16. The apparatus of claim 14, wherein the two segments are each at least 40 microns long.

17. The apparatus of claim 16, wherein the two segments are such that an integrated mode dispersion of the planar optical resonator does not exceed 0.4 GHz over an optical frequency bandwidth of 2% of a target operating optical frequency of the planar optical resonator.

18. The apparatus of claim 12, wherein the two optical waveguide cores comprise silicon nitride.

19. An apparatus comprising:
a planar optical resonator comprising two optical waveguide cores located along a planar surface of a substrate, the two optical waveguide cores comprising:
a first optical waveguide core forming a first loop, and
a second optical waveguide core forming a second loop inside the first loop; and
a bus optical waveguide being optically coupled to the first optical waveguide core in a bus coupling region; and
wherein one of the two optical waveguide cores varies in size such that an integrated mode dispersion of the planar optical resonator does not exceed 0.4 GHz over an optical frequency bandwidth of 2% of a target operating optical frequency of the planar optical resonator.

20. The apparatus of claim 19, wherein a width of the one of the two optical waveguide cores changes by at least 40 nm between a first section and a second section of the planar optical resonator, each of the first and second sections comprising laterally adjacent segments of the two optical cores, the laterally adjacent segments being such that the two optical waveguide cores are resonantly optically coupled in the first and second sections in different wavelength regions.

21. An apparatus comprising:
a planar optical resonator comprising two optical waveguide cores located along a planar surface of a substrate, the two optical waveguide cores comprising:
a first optical waveguide core forming a first loop, and
a second optical waveguide core forming a second loop inside the first loop; and
a bus optical waveguide being optically coupled to, at least, the first optical waveguide core in a bus coupling region;
wherein end-connected first and second segments of the planar optical resonator comprise evanescently coupled segments of the two optical waveguide cores;
wherein the two optical waveguide cores are configured to co-propagate light therealong at a first wavelength in the first segment of the optical resonator, and
wherein the two optical waveguide cores are configured to co-propagate light therealong at a different second wavelength in the second segment of the optical resonator.

22. The apparatus of claim 21, wherein one of the optical waveguide cores has a smaller width in the first segment of the planar optical resonator section than in the second segment of the optical resonator.

23. The apparatus of claim 21 wherein the one of the optical waveguide cores comprises a tapered section between the first and second segments of the optical resonator.

24. The apparatus of claim 21, wherein the one of the first and second wavelengths are spaced by a wavelength spacing in a range from 40 nm to 400 nm.

25. The apparatus of claim 21, further comprising a laser connected to inject light into the bus waveguide such that the planar optical resonator outputs light whose spectrum has a comb of wavelength peaks.

* * * * *